: US 9,375,794 B2
(45) Date of Patent: Jun. 28, 2016

(12) United States Patent
Chen et al.

(54) TABLE INSERT FOR CIRCULAR SAW

(71) Applicant: Rexon Industrial Corp., Ltd., Taichung (TW)

(72) Inventors: Jung-Huo Chen, Taichung (TW); Yung Chiang Ku, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 34 days.

(21) Appl. No.: 14/458,612

(22) Filed: Aug. 13, 2014

(65) Prior Publication Data

US 2015/0047488 A1  Feb. 19, 2015

(30) Foreign Application Priority Data

Aug. 15, 2013  (TW) .............................. 102129368 A

(51) Int. Cl.
- *B27B 5/22* (2006.01)
- *B23D 45/04* (2006.01)
- *B23D 47/02* (2006.01)
- *B27B 5/29* (2006.01)

(52) U.S. Cl.
CPC ............ *B23D 45/048* (2013.01); *B23D 47/025* (2013.01); *B27B 5/29* (2013.01); *Y10T 83/7684* (2015.04)

(58) Field of Classification Search
CPC .. B23D 45/044; B23D 45/048; B23D 47/025; Y10T 83/857; Y10T 83/7997; Y10T 83/863; Y10T 83/773; Y10T 83/9461; Y10T 83/7684; B27B 5/29
USPC ........... 83/471, 471.3, 477.2, 522.18, 522.25, 83/698.31, 490, 473; 384/620, 623; 403/393, 386; 24/324, 662, 279
See application file for complete search history.

(56) References Cited

U.S. PATENT DOCUMENTS

| | | | | |
|---|---|---|---|---|
| 2,709,463 A | * | 5/1955 | Gustin ................. | B23D 47/025 83/411.41 |
| 3,285,303 A | * | 11/1966 | Kwiatkowski ....... | B23D 47/025 83/477.1 |
| 3,289,713 A | * | 12/1966 | Herzog ................ | B23D 47/025 292/228 |
| 5,159,864 A | * | 11/1992 | Wedemeyer ......... | B23D 47/025 83/13 |
| 5,970,835 A | * | 10/1999 | Kenyon ............... | B23D 47/025 144/1.1 |
| 6,076,445 A | | 6/2000 | Kenyon et al. | |
| 6,422,116 B1 | | 7/2002 | Kenyon et al. | |
| 6,431,042 B1 | * | 8/2002 | Brault ................. | B23D 45/044 83/471.3 |
| 7,134,373 B1 | * | 11/2006 | Vice .................... | B23D 47/025 83/471.2 |
| 7,249,549 B2 | * | 7/2007 | Stoffel ................. | B23D 47/025 144/286.1 |
| 2005/0229761 A1 | * | 10/2005 | Bettacchini ............... | B27B 5/29 83/490 |
| 2011/0162502 A1 | * | 7/2011 | Thomas ................ | B23D 47/00 83/471.3 |
| 2011/0203438 A1 | | 8/2011 | Nenadic et al. | |

* cited by examiner

*Primary Examiner* — Ghassem Alie
(74) *Attorney, Agent, or Firm* — Bacon & Thomas, PLLC

(57) ABSTRACT

A table insert for a circular saw includes a stationary panel and a movable panel. The stationary panel is fixed on a worktable of the circular saw and partially covers a trough of the worktable, and the movable panel is pivotally connected to the stationary panel and is pivotally movable relative to the stationary panel between a first position and a second position. When the movable panel is located in the first position, the movable panel partially covers the trough to enable the cutting operation to be performed. When the movable panel is located in the second position, the trough is partially uncovered for conveniently allowing a user to remove sawdust from the trough or to take out small workpieces that fall into the trough.

6 Claims, 9 Drawing Sheets

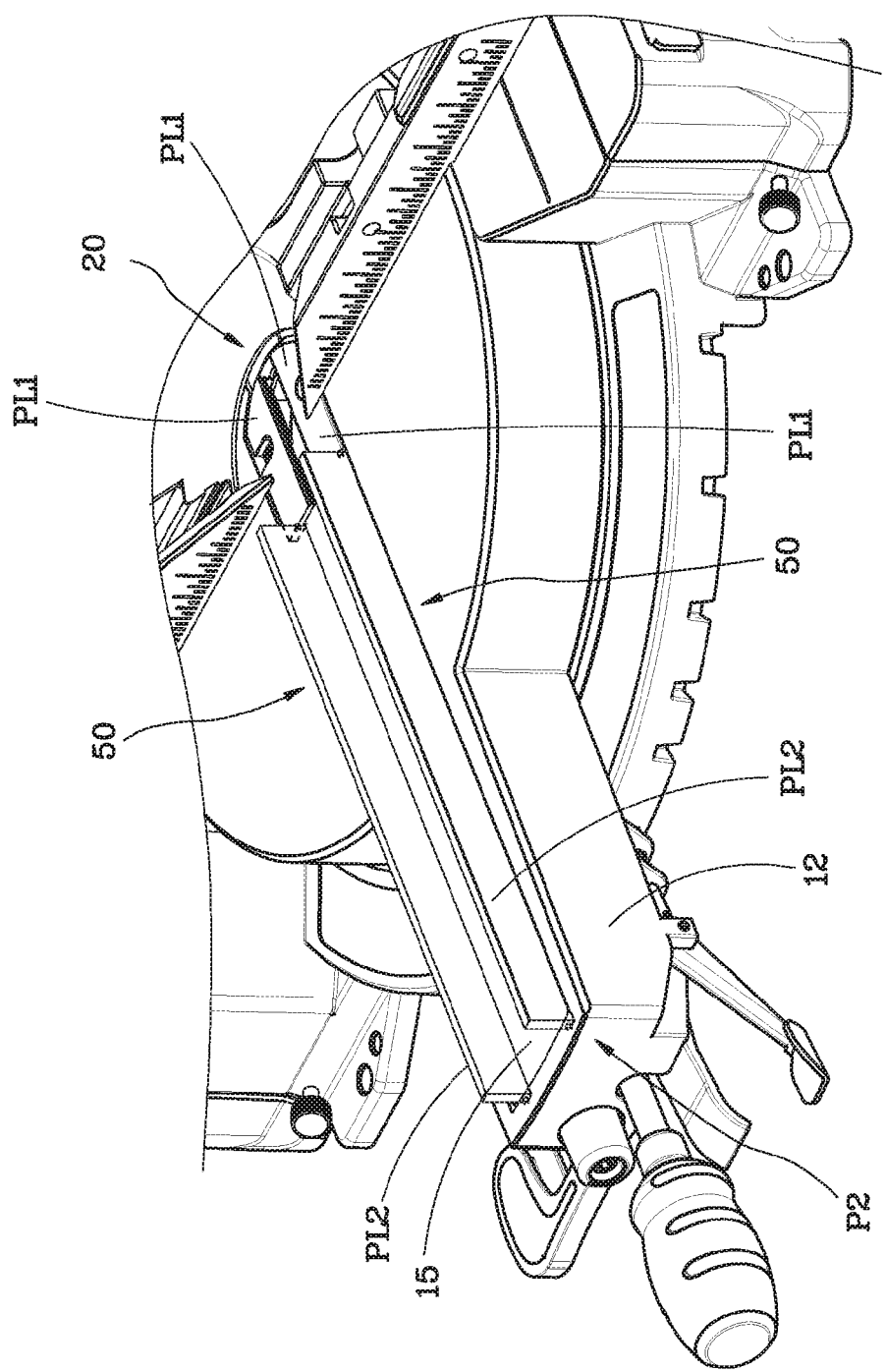

TABLE INSERT FOR CIRCULAR SAW

FIELD OF THE INVENTION

The present invention relates to a circular saw, and more specifically, to a table insert for a circular saw.

BACKGROUND

A traditional circular saw (i.e. miter saw) usually has a trough formed on a worktable adapted for allowing the saw blade to pass partially through such that cuts at various angles can be made. In order to provide support to a workpiece of small size on the worktable, and to prevent sawdust or debris from falling into the trough from kickback due to rotation of the saw blade, the trough is usually covered by a table insert made of soft material. The table insert has a cutting slot formed thereon for allowing the saw blade to pass therethrough. However, when a cutting operation is performed, debris or wood chips of smaller size may still fall into the trough through the cutting slot. If the trough is not cleaned immediately, the clogged debris and wood chips may still kickback from the trough due to rotation of the saw blade and may lead to injury to the user.

As shown in FIG. 1, the conventional table insert 4 for a circular saw is threadedly secured to the worktable through a plurality of bolts. When cleaning the trough 3, the user must loosen all the bolts to remove the table insert. When the debris/chips are removed, the user once again needs to tighten all the bolts to secure the table insert 4 to the worktable. Therefore, it can be concluded that the conventional table insert 4 for a circular saw is inconvenient to install, which consequently impacts the cutting efficiency.

SUMMARY OF THE INVENTION

The present invention has been accomplished under the circumstances in view.

It is therefore the main object of the present invention to provide a table insert for a circular saw which allows a user to clean the chips/debris easily.

To achieve these and other objects of the present invention, the table insert for a circular saw in accordance with the present invention is mounted to a worktable of the circular saw. The circular saw has a trough formed thereon adapted for allowing the saw blade to pass therethrough and a trough opening which communicates with the trough. A first embodiment of the table insert for a circular saw in accordance with the present invention comprises a stationary panel and a movable panel. The stationary panel is disposed on the trough opening and partially covers the trough. The stationary panel has a first plane formed thereon. The movable panel is pivotally connected to the stationary panel and has a second plane formed thereon. The movable panel partially covers the trough and is pivotally movable relative to the stationary panel between a first position and a second position.

When the movable panel is at the first position, the second plane of the movable panel and the first plane of the stationary panel are substantially co-planar, and the movable panel is located on the trough opening for partially covering the trough. Therefore, a workpiece can be properly placed on the worktable and a cutting operation can be performed. When the movable panel is at the second position, a predetermined angle is formed between the second plane of the movable panel and the first plane of the stationary panel, such that the movable panel is disengaged from the trough opening and at least partially uncovers the trough for allowing the user to conveniently clean the chips/debris in the trough.

A second embodiment of the table insert for a circular saw in accordance with the present invention comprises a stationary panel and two movable panels. The stationary panel is disposed on the trough opening and partially covers the trough. The stationary panel has a first plane formed thereon. Each movable panel has a second plane formed thereon. Each movable panel has two ends respectively and pivotally connected to the worktable and the stationary panel such that each movable panel is pivotally movable relative to the worktable between the first position and the second position. When the movable panels are at the first position, the second planes of the movable panels and the first plane of the stationary panel are substantially co-planar, such that the movable panels partially cover the trough. Therefore, a workpiece can be properly placed on the worktable and a cutting operation can be performed. When the movable panels are at the second position, second planes of the movable panels are substantially perpendicular to the first plane of the stationary panel, such that the trough is at least partially uncovered for allowing the user to conveniently clean the chips/debris in the trough.

BRIEF DESCRIPTION OF THE DRAWINGS

Advantages and features of the present invention will be understood by reference to the following specification in conjunction with the accompanying drawings, in which like reference numbers denote like elements of structure and component parts.

FIG. 9 is a perspective view of the second embodiment in accordance with the present invention, wherein the movable panels are at the second position.

Figure 1:
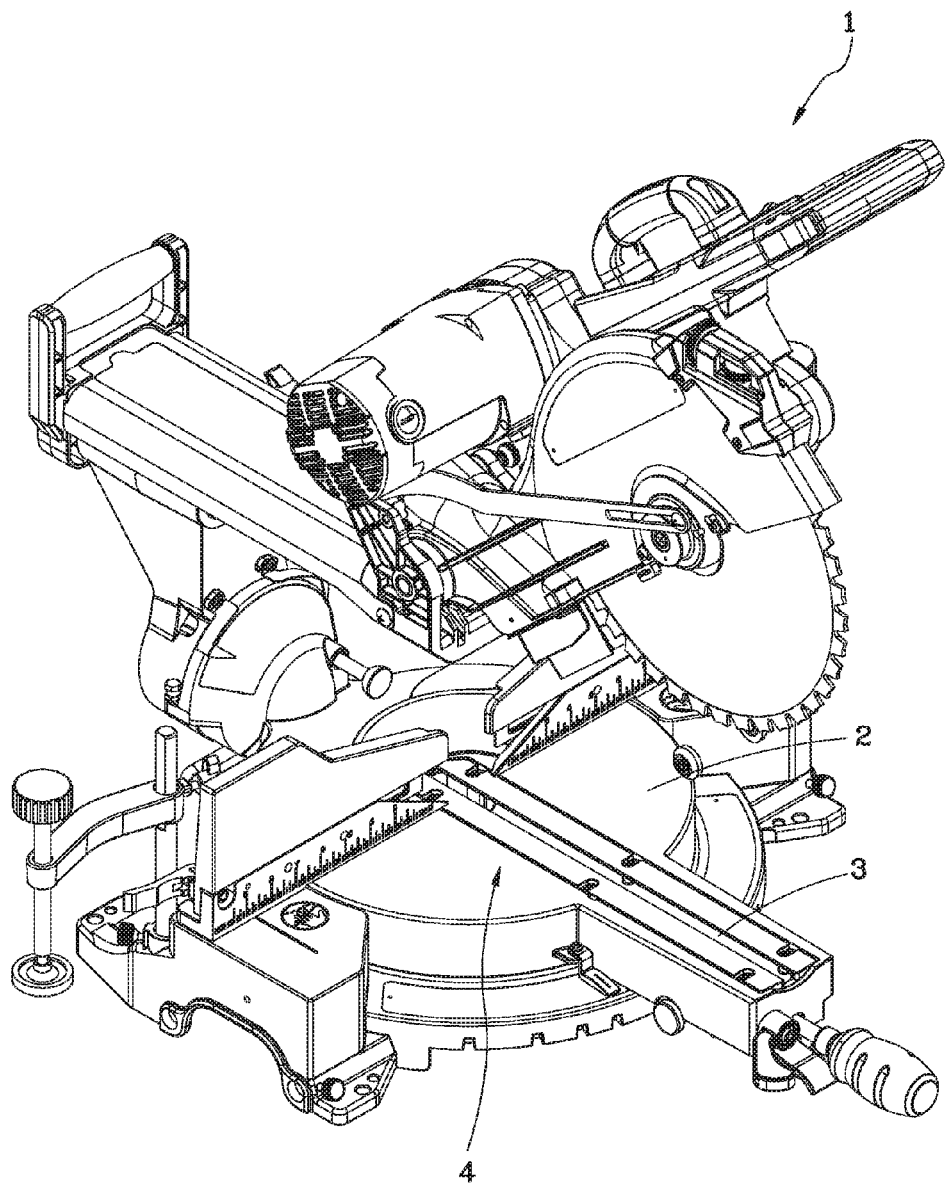
FIG. 1 is a perspective view of a conventional table insert for a circular saw.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of the present invention and the components thereof, and in no way limits the structures, configurations and components thereof according to the present disclosure.

DETAILED DESCRIPTION

Figure 2:
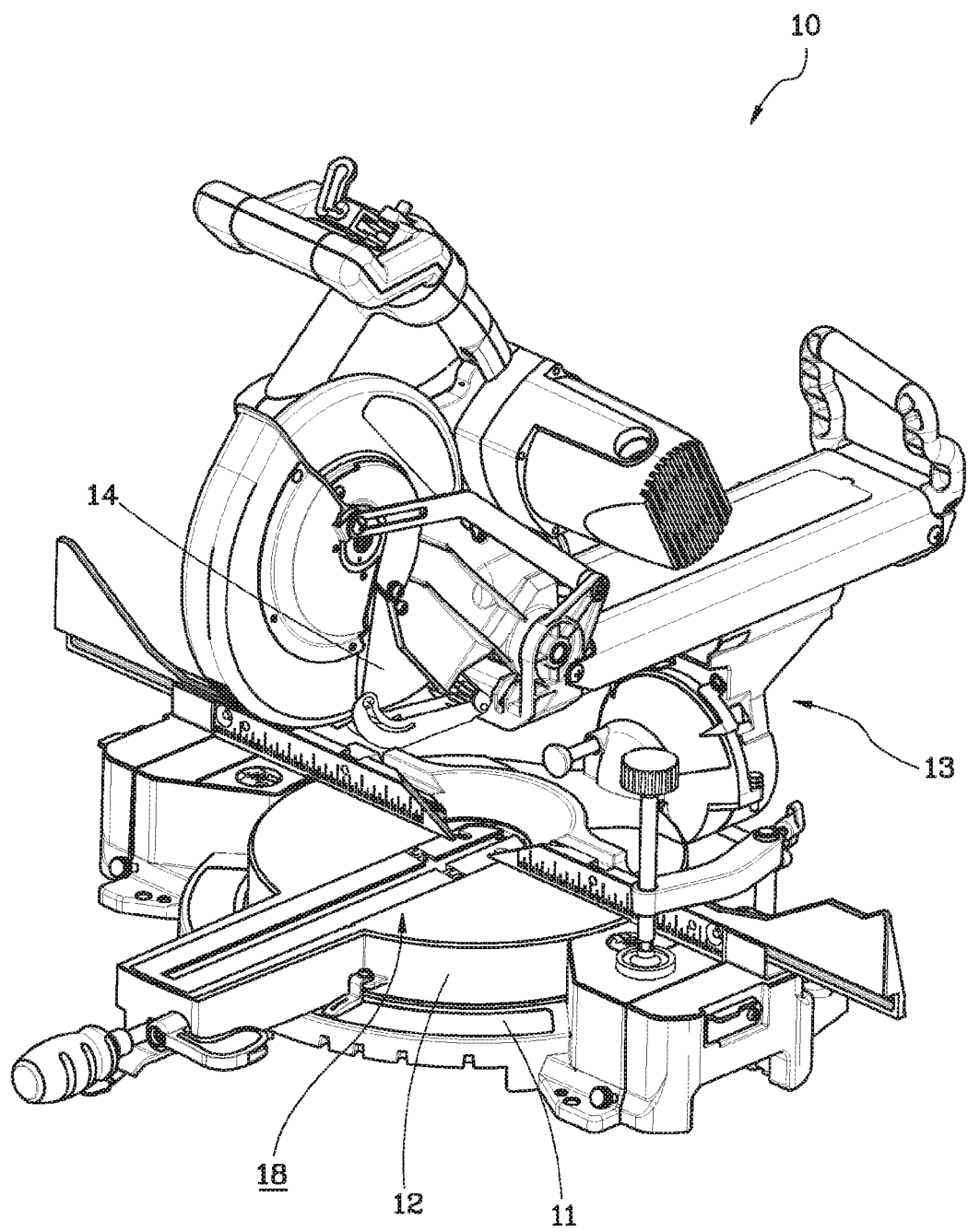
FIG. 2 is a perspective view of a table insert for a circular saw in accordance with a first embodiment of the present invention.
Figure 3:
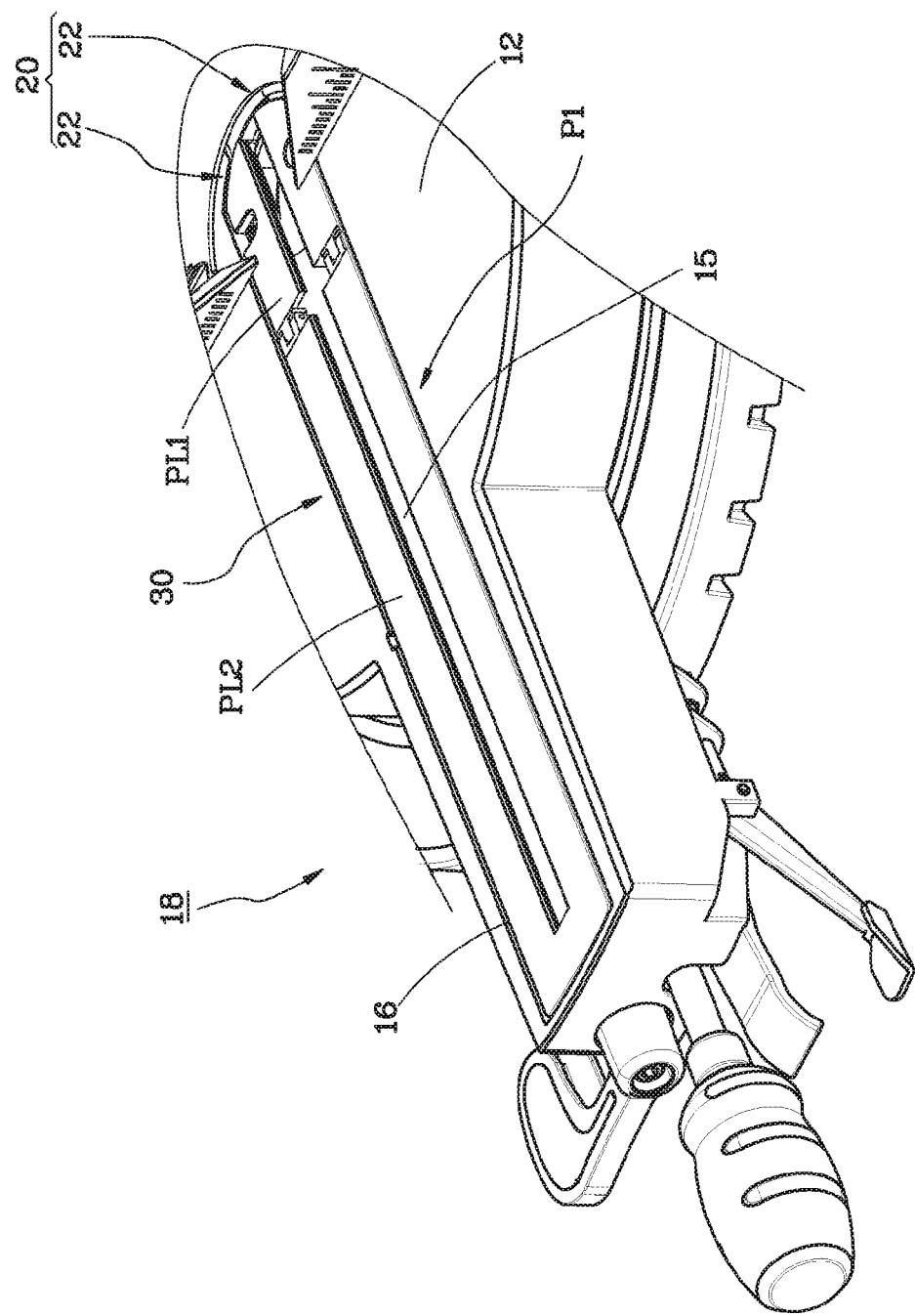
FIG. 3 is a perspective view of the table insert for a circular saw in accordance with the first embodiment of the present invention, wherein a movable panel is at a first position.
Figure 6:
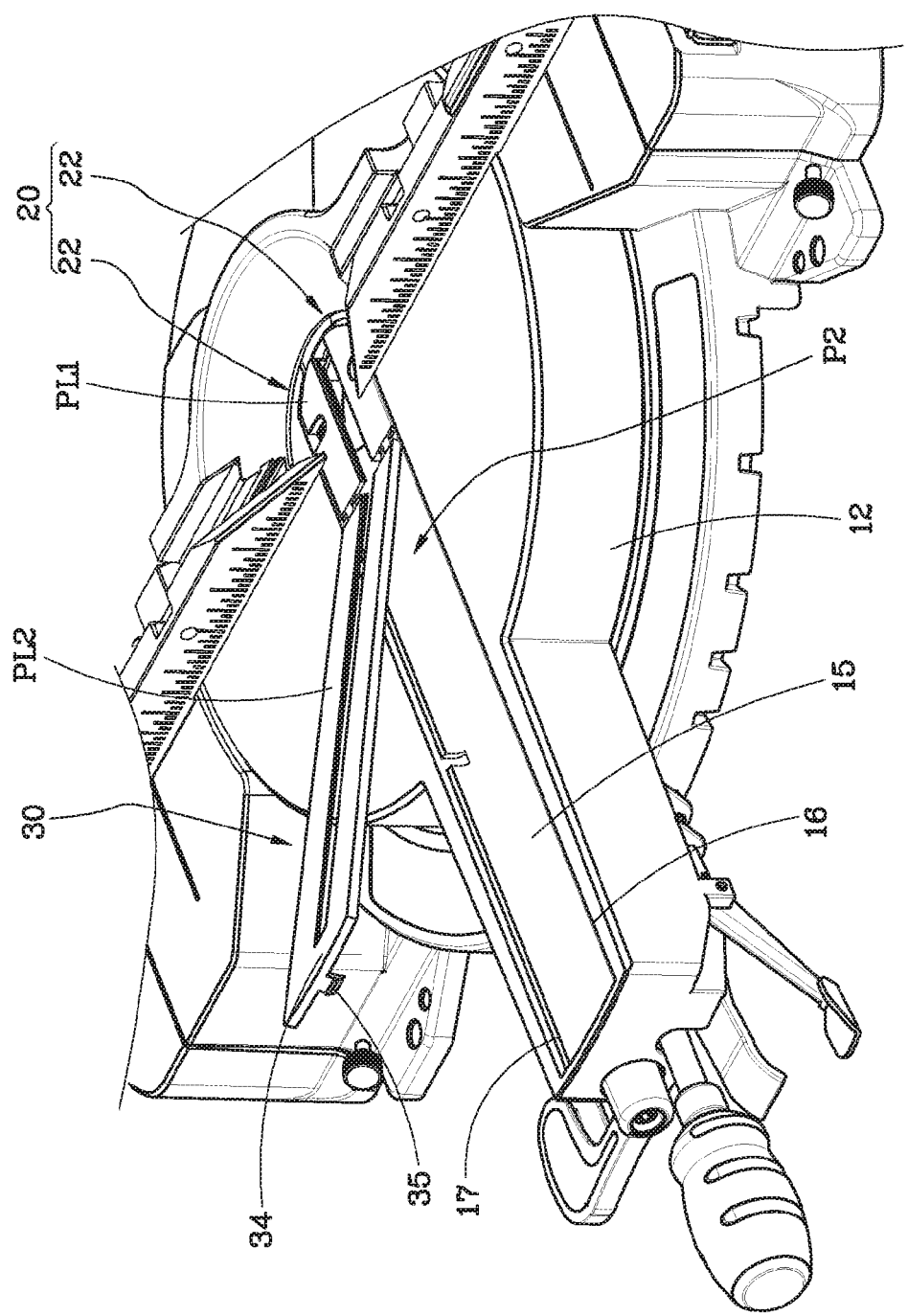
FIG. 6 is a perspective view of the first embodiment in accordance with the present invention, wherein the movable panel is at a second position.

Referring to FIGS. 2-3, a circular saw 10 includes a base 11, a worktable 12 fixed to the base 11, a saw arm 13 pivotally connected to the base 11, and a saw blade 14 mounted to the saw arm 13. The worktable 12 has a trough 15 formed thereon adapted for allowing the saw blade 14 to pass therethrough, and a trough opening 16 communicates with the trough 15 and has an inner flange 17 formed thereon (as shown in FIG. 6). The structure of circular saws is well-known in the art, therefore the detailed structures and operation of the circular saw will not be further described herein. Referring to FIG. 3, a first embodiment of a table insert 18 for a circular saw in accordance with the present invention comprises a stationary panel 20 and a movable panel 30.

Figure 4:
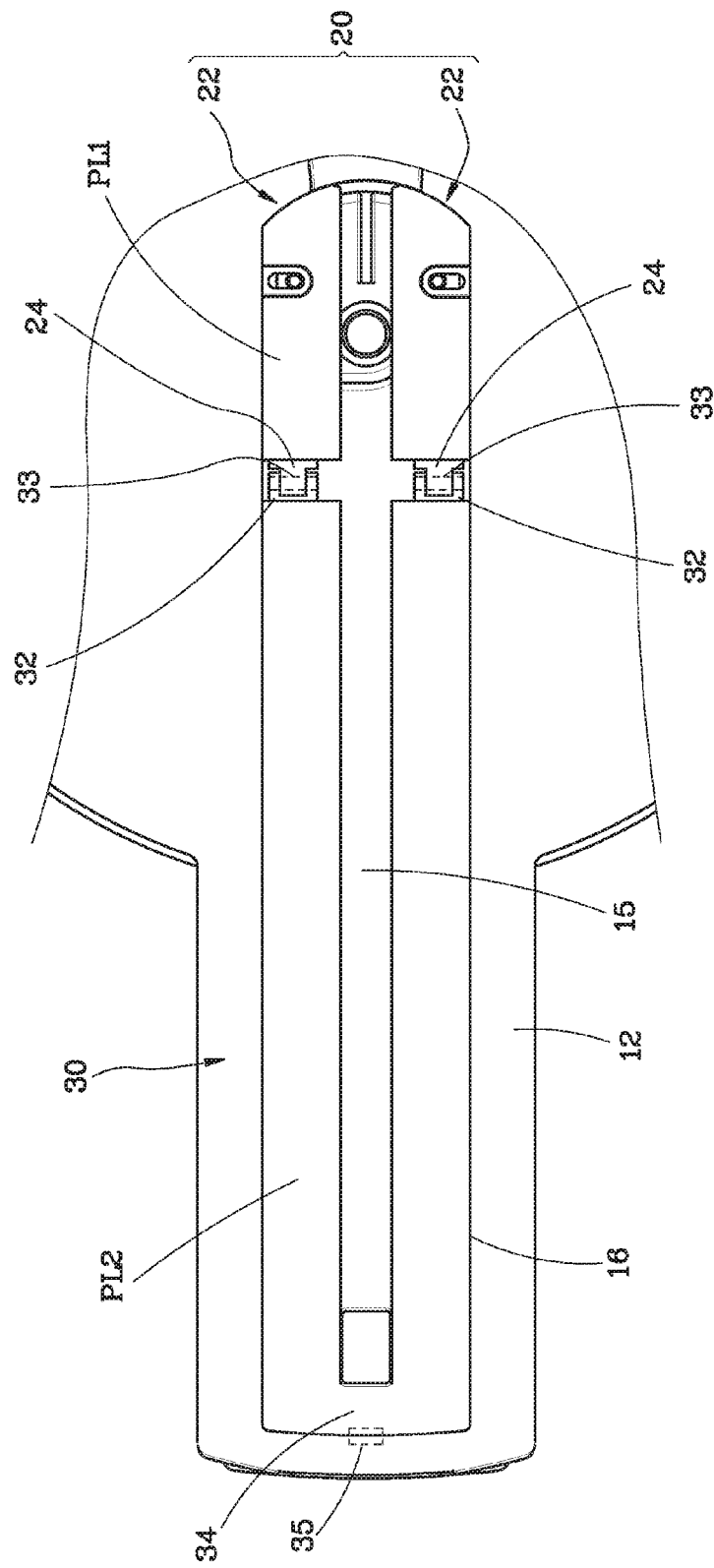
FIG. 4 is a top view of the first embodiment in accordance with the present invention.

The stationary panel 20 has two corresponding board members 22. Each board member 22 has a first pivot member 24 formed on one end thereof (as shown in FIG. 4). The two board members 22 are respectively disposed on the inner flange 17 for covering the trough opening 16, and the board members 22 are spacedly arranged relative to each other. The two board members 22 form a first plane PL1 that partially covers the trough 15. It is to be noted that various structures of the stationary panel 20 can be adapted. However, it is a preferable option to apply two board members 22.

The movable panel 30 has a second plane PL2 formed thereon, two second pivot members 32 are disposed on one end of the movable panel 30 which is proximate to the stationary panel 20 (as shown in FIG. 4). Each second pivot member 32 of the movable panel 30 is pivotally connected to the corresponding first pivot member 24 of the board members 22 via a pivot shaft 33. Each pivot shaft 33 extends along an axial direction which is substantially perpendicular to an extending direction of the trough 15, such as its longitudinal direction. Thereby, the movable panel 30 is pivotally movable relative to the stationary panel 20 between a first position P1 and a second position P2.

Figure 5:
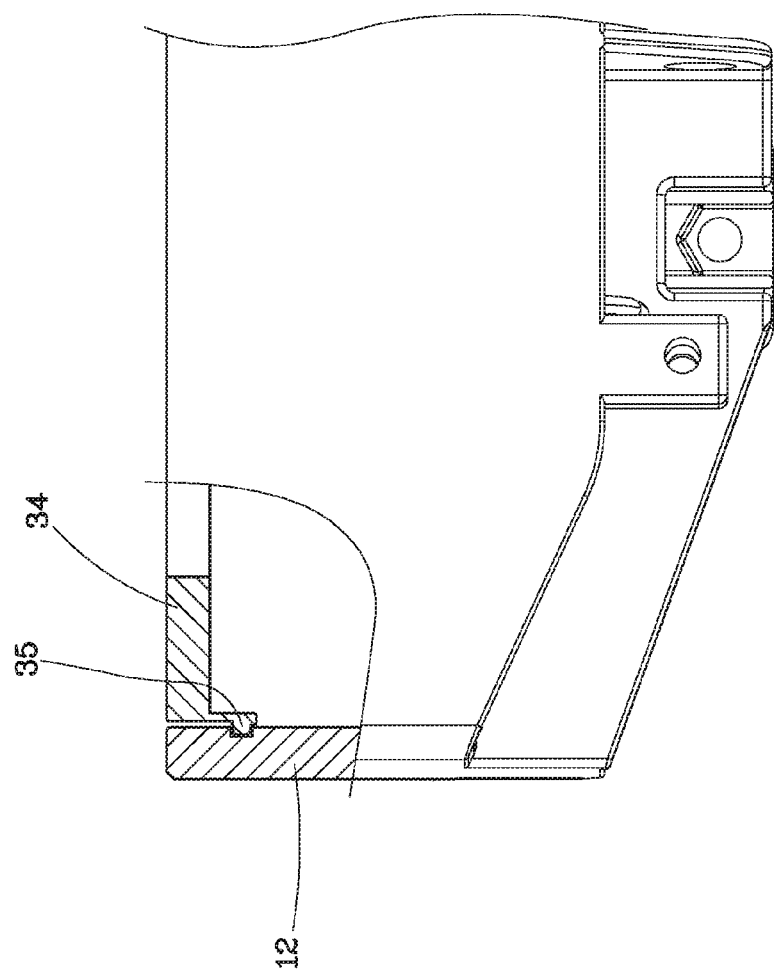
FIG. 5 is a partial cross-sectional view of the first embodiment in accordance with the present invention, wherein a securing portion of the movable panel is secured to a worktable.

As shown in FIG. 3, when the movable panel 30 is at the first position P1, the second plane PL2 of the movable panel 30 and the first plane PL1 of the stationary panel 20 are substantially co-planar. The movable panel 30 is therefore disposed on the inner flange 17 of the worktable 12 such that the movable panel 30 is located on the trough opening 16 and partially covers the trough 15. Thereby, when a cutting operation is performed, the saw blade 14 passes into the trough 15 through a gap (not numbered) which is not covered by the stationary panel 20 and the movable panel 30. Further referring to FIG. 6, when the movable panel 30 is at the second position P2, a predetermined angle is formed between the second plane PL2 of the movable panel 30 and the first plane PL1 of the stationary panel 20, such that the movable panel 30 is disengaged from the trough opening 16 for uncovering the trough 15. The movable panel 30 has a lifting portion 34 which is formed on a distal end thereof which is away from the movable panel 20. A securing portion 35 downwardly extends from the lifting portion 34 for securing the movable panel 30 to the worktable 12 (as shown in FIG. 5) such that the movable panel 30 is stably secured when located at the first position P1. The lifting portion 34 allows a user to easily lift up the movable panel 30 from the first position P1 to the second position P2. It is worth mentioning that various modifications and enhancements may be made as long as the movable panel 30 can be secured to the worktable 12.

The operation of the table insert for a circular saw in accordance with the present invention will be described in details below. When the user wishes to lift up the movable panel 30, he or she may use one finger to lift up the lifting portion 34 of the movable panel 30, and gently exert force on the movable panel 30 to disengage the securing portion 35 of the movable panel 30 from the worktable 12. As shown in FIG. 6, the movable panel 30 is pivotally rotated around the pivot shaft 33 from the first position P1 to the second position P2 and uncovers the trough 15 for allowing the user to clean the chips and debris in the trough 15. When the trough 15 is cleaned, the user flips the movable panel 30 from the second position P2 back to the first position P1 (as shown in FIG. 3) until the securing portion 35 of the movable panel 30 is once again secured to the worktable 12. When the movable panel 30 is at the first position P1, workpiece can be properly placed on the worktable 12 and the cutting operation can be performed by operating the saw blade 14 through the saw arm 13.

Figure 7:
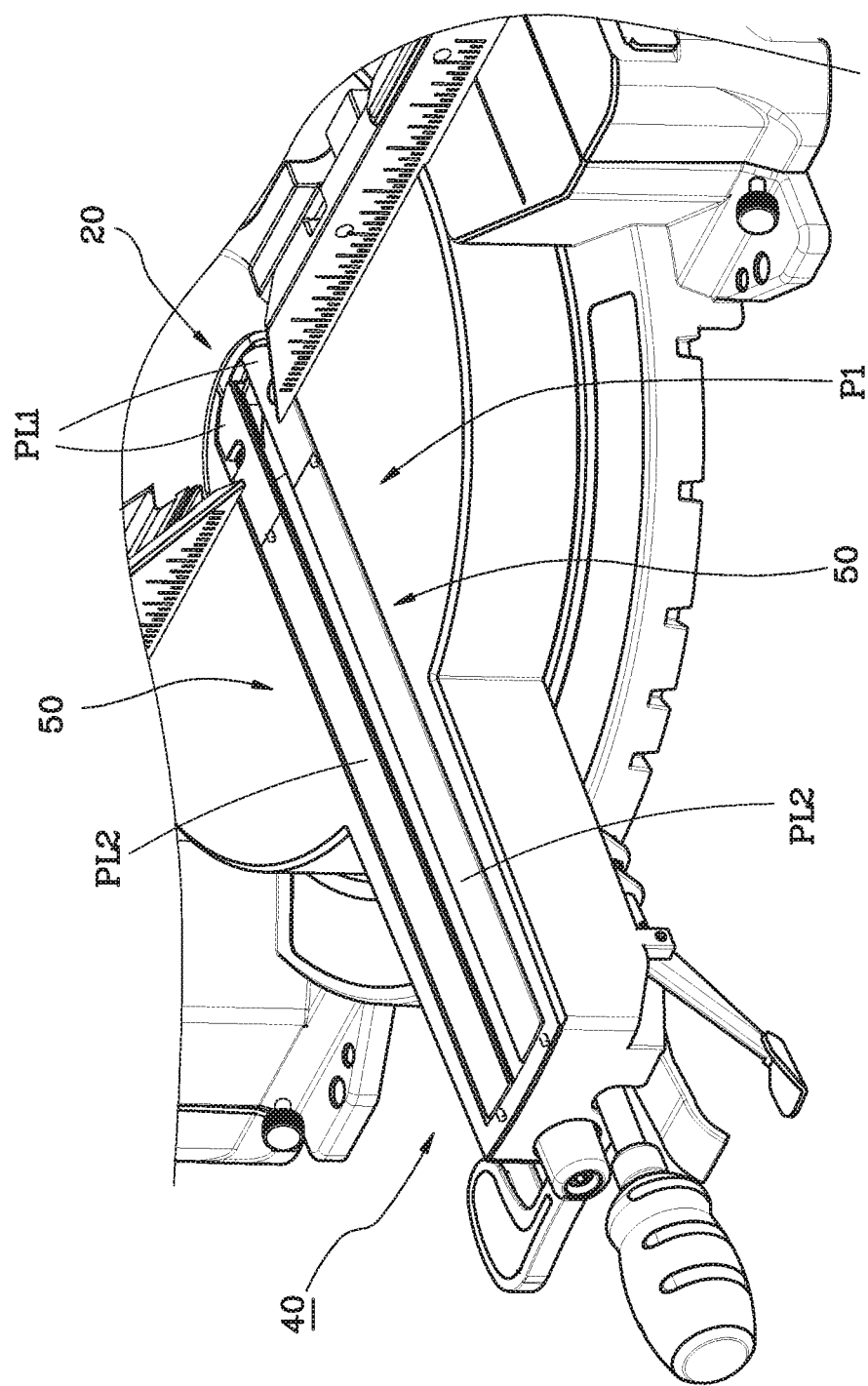
FIG. 7 is a perspective view of a second embodiment in accordance with the present invention, wherein the movable panels are at the first position.
Figure 8:
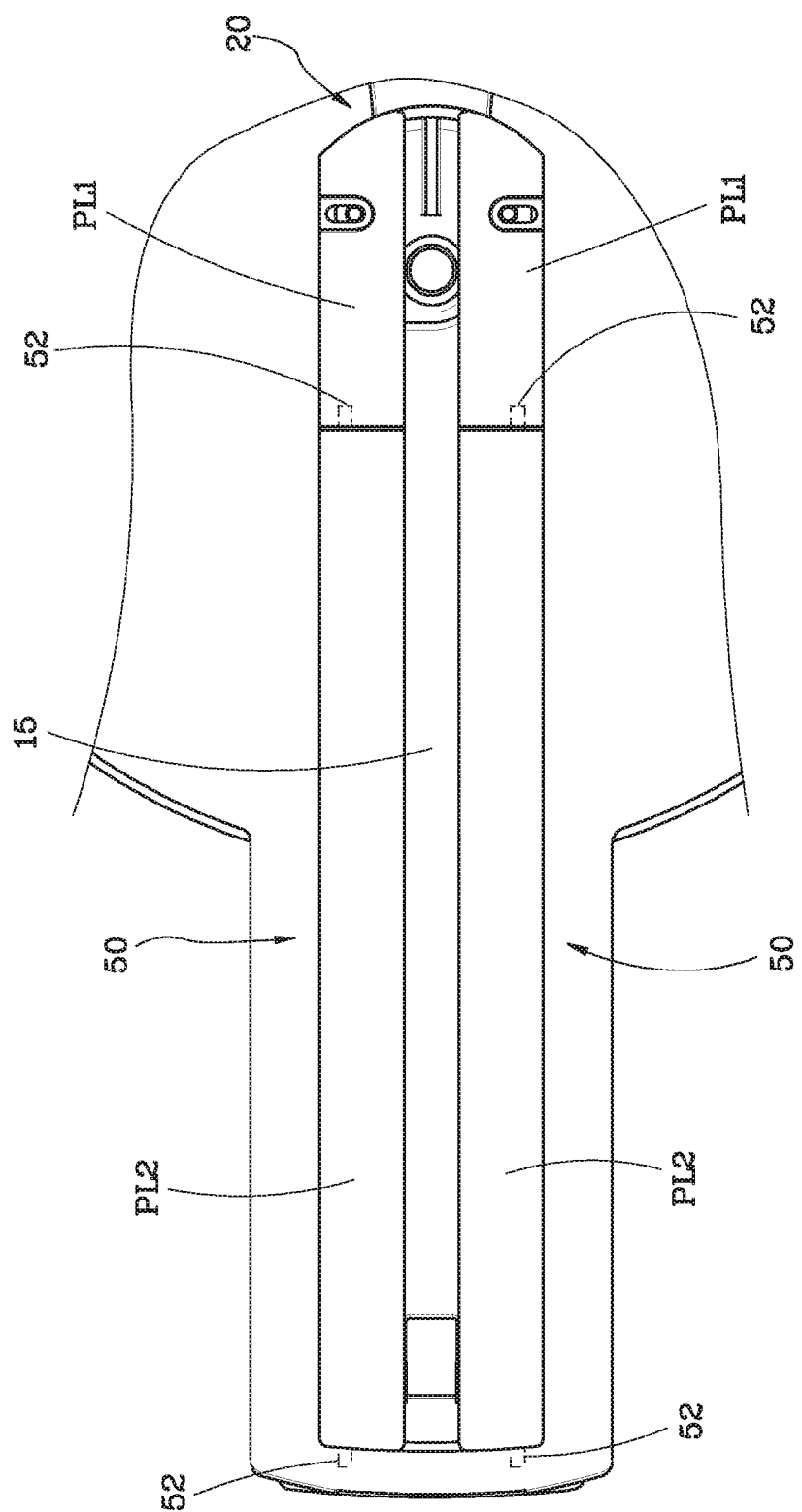
FIG. 8 is a top view of the second embodiment in accordance with the present invention.

With reference to FIGS. 7-8, a second embodiment of the present invention is shown. The element and effects of the second embodiment which are the same as the first embodiment are not described, only the differences are described. In this embodiment, two movable panels 50 are applied, wherein each movable panel 50 has a second plane PL2 formed thereon. Each movable panel 50 has two ends respectively and pivotally connected to the worktable 12 and the board member 22 of stationary panel 20 via pivot shafts 52. Each pivot shaft 52 extends along an axial direction which is substantially parallel to an extending direction of the trough 15, such as its longitudinal direction. Thereby, each movable panel 50 is pivotally movable relative to the worktable 12 between the first position P1 and the second position P2. As shown in FIG. 7, when the movable panels 50 are at the first position P1, the second planes PL2 of the movable panels 50 and the first plane PL1 of the stationary panel 20 are substantially co-planar, such that the movable panels 30 partially cover the trough 15. Further referring to FIG. 9, when the movable panels 50 are at the second position P2, the second planes PL2 of the movable panels 50 and the first plane PL1 of the stationary panel 20 are substantially perpendicularly arranged. More specifically, the second planes PL2 and the first plane PL1 are perpendicularly arranged such that the trough 15 is substantially uncovered.

The operation of the table insert for circular saw in accordance with the second embodiment will be described in details below. When the user wishes to clean up the chips/debris in the trough 15, he or she may extend one finger into the gap (not numbered) formed between the two movable panels 50 to lift open the movable panels 50 from the first position P1 to the second position P2, such that the trough 15 is uncovered for allowing the user to clean the chips/debris in the trough 15. When the trough 15 is cleaned, the user flips the movable panels 50 from the second position P2 back to the first position P1 (as shown in FIG. 7). When the movable panels 50 are at the first position P1, a workpiece can be properly placed on the worktable 12 and the cutting operation can be performed by operating the saw blade 14 through the saw arm 13.

In view of the above, the table insert 18, 40 for a circular saw in accordance with the present invention uses movable panels 30, 50 for allowing users to easily remove the chips/debris in the trough 15 without having to remove the table insert 18, 40, and therefore greatly enhances the accessibility for cleaning the chips/debris compared to that of conventional designs, thus improving cutting efficiency.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A table insert for circular saw having a saw blade and a worktable, the worktable has a trough formed thereon adapted for allowing the saw blade to pass therethrough and a trough opening communicated with the trough, the table insert comprising:

a stationary panel disposed on the trough opening and partially covering the trough, the stationary panel having a first plane formed thereon; and a movable panel disposed on the trough opening and partially covering the trough, and pivotally connected to the stationary panel such that the movable panel is pivotally movable relative to the stationary panel between a first position and a second position, the movable panel having second plane formed thereon;

wherein, the second plane of the movable panel and the first plane of the stationary panel are substantially co-planar when the movable panel is at the first position such that the movable panel is located on the trough opening for partially covering the trough, and the second plane and the first plane are substantially at a predetermined angle when the movable panel is at the second position such that the trough is at least partially uncovered; and wherein the stationary panel includes at least one first pivot member disposed on one end thereof, the movable panel includes at least one second pivot member disposed on one end thereof, and a pivot shaft pivotally connects the first pivot member and the second pivot member, the pivot shaft extending through an axial direction substantially perpendicular to an extending direction of the trough.

2. The table insert for a circular saw as claimed in claim 1, wherein the stationary panel includes two board members correspondingly and spacedly secured to the worktable and forming the first plane, each board member respectively having one of the first pivot members located thereon, and wherein one end of the movable panel includes two second pivot members located thereon and respectively corresponding to the first pivot members.

3. The table insert for a circular saw as claimed in claim 1, wherein the movable panel has a lifting portion formed on a distal end thereof, the lifting portion having a securing portion formed thereon for detachably securing the movable panel to the worktable.

4. A table insert for a circular saw having a saw blade and a worktable, the worktable having a trough formed thereon and adapted for allowing the saw blade to pass therethrough and a trough opening in communication with the trough, the table insert comprising:

a stationary panel disposed on the trough opening and partially covering the trough, the stationary panel having a first plane formed thereon; and two movable panels disposed on the trough opening, each movable panel having a second plane formed thereon and further having two ends respectively and pivotally connected directly to the worktable and the stationary panel such that the each movable panel is individually and pivotally movable relative to the stationary panel between a first position and a second position;

wherein, the second planes of the movable panels and the first plane of the stationary panel are substantially co-planar when the movable panels are at the first position such that the movable panels partially cover the trough, and each second plane of the movable panel is substantially perpendicularly arranged relative to the first plane of the stationary panel when the movable panels are at the second position such that the trough is at least partially uncovered.

5. A table insert for a circular saw as claimed in claim 4, wherein each movable panel has two ends respectively and pivotally connected to the worktable and the stationary panel via pivot shafts, each pivot shaft extending in an axial direction substantially parallel to an extending direction of the trough.

6. A table insert for a circular saw as claimed in claim 4, wherein the stationary panel has two corresponding board members forming the first plane, and each movable panel having two ends respectively and pivotally connected to the worktable and the board member of the stationary panel via pivot shafts.

\* \* \* \* \*